United States Patent [19]

Morota

[11] Patent Number: 5,740,770
[45] Date of Patent: Apr. 21, 1998

[54] VARIABLE INTAKE AIR APPARATUS

[75] Inventor: Kenjiro Morota, Toyota, Japan

[73] Assignee: Toyota Jidosha Kabushiki Kaisha, Aichi-ken, Japan

[21] Appl. No.: 799,267

[22] Filed: Feb. 13, 1997

[30] Foreign Application Priority Data

Feb. 16, 1996 [JP] Japan ..................... 8-029518

[51] Int. Cl.⁶ ........................................... F02M 35/10
[52] U.S. Cl. ............................................ 123/184.55
[58] Field of Search .................... 123/184.21, 184.55

[56] References Cited

U.S. PATENT DOCUMENTS 5,009,200  4/1991  Van Basshuysen et al. ....... 123/184.55

FOREIGN PATENT DOCUMENTS

| | | | |
|---|---|---|---|
| 4137704 | 5/1993 | Germany | 123/184.55 |
| 57-153731 | 9/1982 | Japan. | |
| 58-181930 | 12/1983 | Japan. | |
| 60-184924 | 9/1985 | Japan | 123/184.55 |
| 2-199221 | 8/1990 | Japan. | |
| 4-241728 | 8/1992 | Japan | 123/184.55 |
| 2239899 | 7/1991 | United Kingdom | 123/184.55 |

*Primary Examiner*—David A. Okonsky
*Attorney, Agent, or Firm*—Oliff & Berridge, P.L.C.

[57] ABSTRACT

A variable intake apparatus includes an intake manifold. The manifold has a surge tank and a plurality of branch pipes extending therefrom. The air in the surge tank is drawn into the combustion chambers of an engine via the branch pipes. The lengths of the branch pipes are different. A movable pipe is slidably located in each branch pipe. The movable pipes slides within the branch pipes for changing the effective passage length of the intake passages. The passage lengths of the movable pipes are determined such that the effective intake passage lengths are equalized. A motor actuates the movable pipes to slide within the branch pipes based on the engine speed. The movable pipes integrally move with respect to the branch pipes while keeping the passage lengths of the intake passages equalized.

14 Claims, 8 Drawing Sheets

VARIABLE INTAKE AIR APPARATUS

BACKGROUND OF THE INVENTION

1. Field of the Invention

The present invention generally relates to an intake apparatus including a plurality of branch pipes for introducing air into the combustion chambers of an engine. More particularly, the present invention relates to an intake apparatus that controls the passage length of each branch pipe based-on the running condition of an engine.

2. Description of the Related Art

Typically, engines take air into an intake passage from an air cleaner. The air then reaches intake air ports via a throttle body, a surge tank and an intake manifold. Each intake port is then opened by the corresponding intake valve such that intake air is drawn into each combustion chamber. The airflow in the intake manifold includes compression waves (pulsating flow) consisting of low density parts and high density parts.

The airflow air reaches its maximum speed right before each intake port is closed by the corresponding intake valve. If a high density part of the airflow air reaches each suction port at this moment, the inertia effect of the air on each combustion chamber is maximized. This improves the volumetric efficiency of the air filling each combustion chamber. Accordingly, the combustion efficiency of the combustible gas mixture in each combustion chamber is improved. This increases the power of the engine.

The wavelength of the pulsating airflow at the intake manifold increases in accordance with an increase in the passage length of the intake manifold and decreases as the manifold's passage length shortens. The cycle of pulsating air flow at the intake manifold shortens as the engine speed increases and increases as the engine speed decreases. It is therefore desirable that the passage length of the intake manifold be long when the engine speed is low and short when the engine speed is high.

However, engines typically have an intake manifold with a fixed passage length. The maximum inertia effect is only obtained at a certain engine speed, and not at the other engine speeds. Low and intermediate engine speeds are generally used. Therefore, the passage length of the intake manifold is usually set such that an advantageous inertia effect is obtained at low and intermediate engine speeds.

In high-powered engines, it is desirable that an advantageous inertia effect of intake air also be obtained at higher engine speeds. Variable intake apparatuses have been proposed to meet the demand. This type of apparatus has a changeable intake manifold passage length for obtaining maximum inertia effect regardless of engine speed variation.

A variable intake air apparatus 700 shown in FIG. 7 includes an intake manifold 701. The intake manifold 701 includes a surge tank 702, a plurality of branch pipe 703 and a switching valve 704. An end of each pipe 703 is connected with the surge tank 702, while the other end is connected with the corresponding cylinders #1, #2, #3, #4. The switching valve 704 is located in the surge tank 702. The lengths of the branch pipes 703 are the same. The switching valve 704 is selectively opened and closed for changing the effective passage length of the intake manifold 701. In this engine, the switching valve 704 is opened when the engine speed is high for shortening the passage length of the intake manifold 701. This takes advantage of the inertia effect of intake air at high engine speeds. When the engine speed is low, the switching valve 704 is closed for elongating the effective passage length of the intake manifold 701. This takes advantage of the inertia effect of the intake air at low engine speeds.

In some other variable intake apparatuses, the length of the intake manifold is continuously changed. This changes the effective passage length of the intake manifold. Japanese Unexamined Patent Publication No. 2-199221 discloses such a variable intake apparatus. As shown in FIG. 8, this type of variable intake apparatus 700 includes an intake manifold 801. The intake manifold 801 has a surge tank 802, a plurality of branch pipes 803 and a plurality of movable pipes 804. The branch pipes 803 are extended through a wall of the surge tank 802 and are respectively connected with the cylinders #1 to #4 of an engine 805. The pipes 803 have the same length. The movable pipes 804 are accommodated in the surge tank 802. Each movable pipe 804 is telescoped within the corresponding branch pipe 803 based on the engine speed. This continuously changes the effective passage length of each pipe 803. This controls the inertia effect of intake air drawn into each cylinder #1 to #4.

However, in the above apparatuses 700 and 800, it is assumed that the lengths of the branch pipes 703, 803 are the same. The apparatuses 700 and 800 are therefore not applicable to intake manifolds having branch pipes having different lengths. The apparatuses 700, 800 are applied to high-powered engines. In a high-powered engine 705 shown in FIG. 7, a surge tank 702 is located centrally with respect to the engine's longitudinal direction. The arrangement of the surge tank 702 allows the lengths of the pipes 703 to be the same. This permits the engine to achieve a desired power level.

Equalizing the lengths of the branch pipes 703 levels the volume efficiency of intake air drawn into the cylinders #1 to #4. This increases the engine power. The surge tank 702 needs to be located centrally of the engine's longitudinal direction for equalizing the lengths of the pipes 703. This limits the location of the surge tank 702 in an engine compartment. Sufficient space is therefore required in the compartment for the surge tank 702, as well as for the other auxiliary machinery.

The recent trend is to enlarge the passenger's compartment without changing the vehicle's size. The engine compartment size must be reduced accordingly. The reduced engine compartment size trend particularly affects compact vehicles having small engine compartments. Moreover, electronic control units for controlling the engine, and anti-lock brake systems are mounted on more and more vehicles than before. Arranging such auxiliary machinery in the engine compartment further reduces available space in the engine compartment.

The surge tank therefore needs to be offset from the engine's longitudinal center in order to make sufficient space for the other auxiliary machinery. Arranging the surge tank in a position offset from the engine's longitudinal center varies the lengths of the branch pipes with respect to one another. This causes the inertia effect of intake air to be different from one cylinder to another. The combustion efficiency of the air-fuel mixture in the cylinders thus becomes different from one cylinder to another.

Therefore, there is a demand for a variable intake manifold, the position of which is more flexible. That is, a device is needed where the surge tank can be located offset from the engine's longitudinal direction. The effective lengths of branch pipes therefore need to be equal even if the apparent lengths of the pipes are different.

SUMMARY OF THE INVENTION

Accordingly, it is a primary objective of the present invention to provide a variable intake apparatus that increases the engine power over the entire engine speed range. The apparatus includes a plurality of branch pipes, the apparent lengths of which are different. Combustion efficiency of air-fuel mixture in the cylinders are equalized.

To achieve the foregoing and other objects and in accordance with the purpose of the present invention, a variable intake apparatus in combination with an internal combustion engine is provided. The combination includes at least a first and a second combustion chamber located in the engine, sensor means for sensing the state of a running condition of the engine, at least a first and a second intake passage for conducting air to the combustion chambers, respectively. The volumetric efficiency of each of the combustion chambers for a given state of the running condition is related to the length of the associated intake passage. Each intake passage includes a fixed portion and a variable portion. The combination also includes length changing means associated with each variable portion for changing the effective lengths of the intake passages in accordance with a change in the state of the running condition in order to improve the volumetric efficiency of the engine. The length changing means adds a predetermined distance to or subtracts a predetermined distance from the effective length of each intake passage in accordance with the state of the running condition of the engine by changing the variable portion of the intake passage. The predetermined distance added to or subtracted from the effective length of the first intake passage is equal to the predetermined distance added to or subtracted from the effective length of the second intake passage so that the effective length of the first intake passage always substantially matches the effective length of the second intake passage. The lengths of the fixed portions of the two intake passages are significantly different from one another.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

Figure 1:
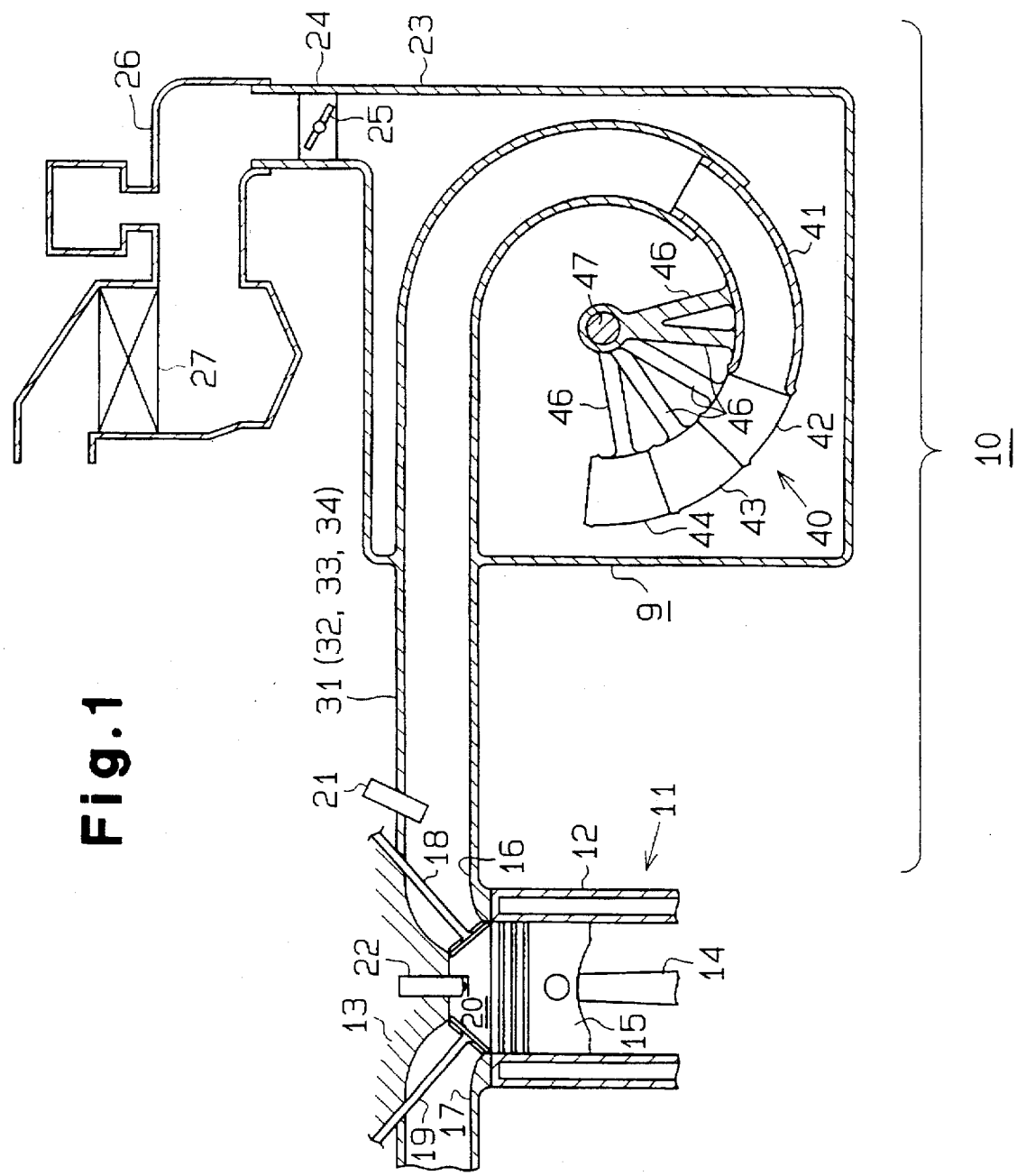
FIG. 1 is a cross-sectional view diagrammatically illustrating the structure of a variable intake apparatus according to a first embodiment of the present invention.
Figure 2:
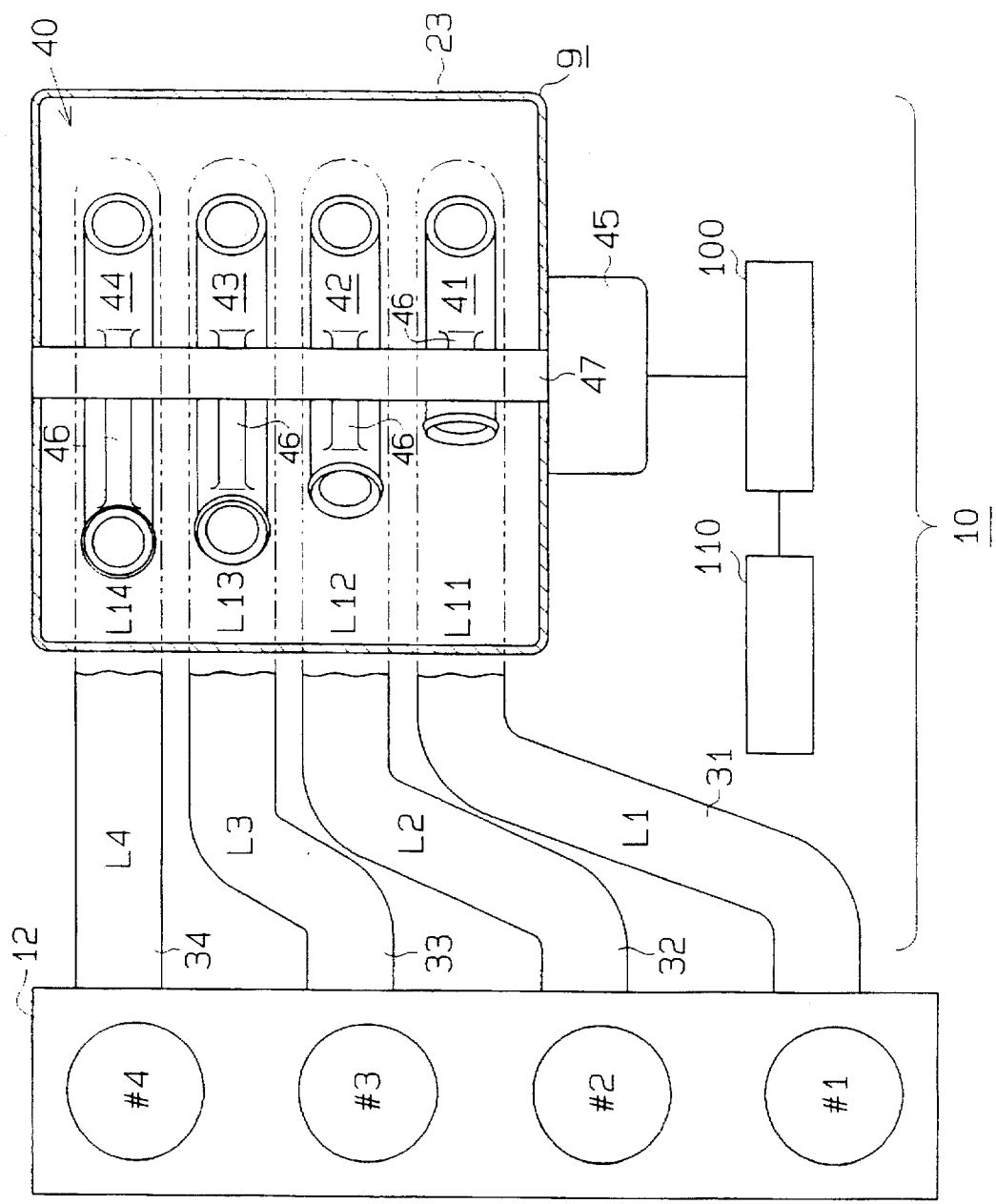
FIG. 2 is a partial cross-sectional plan view illustrating the variable intake apparatus of FIG. 1.
Figure 3:
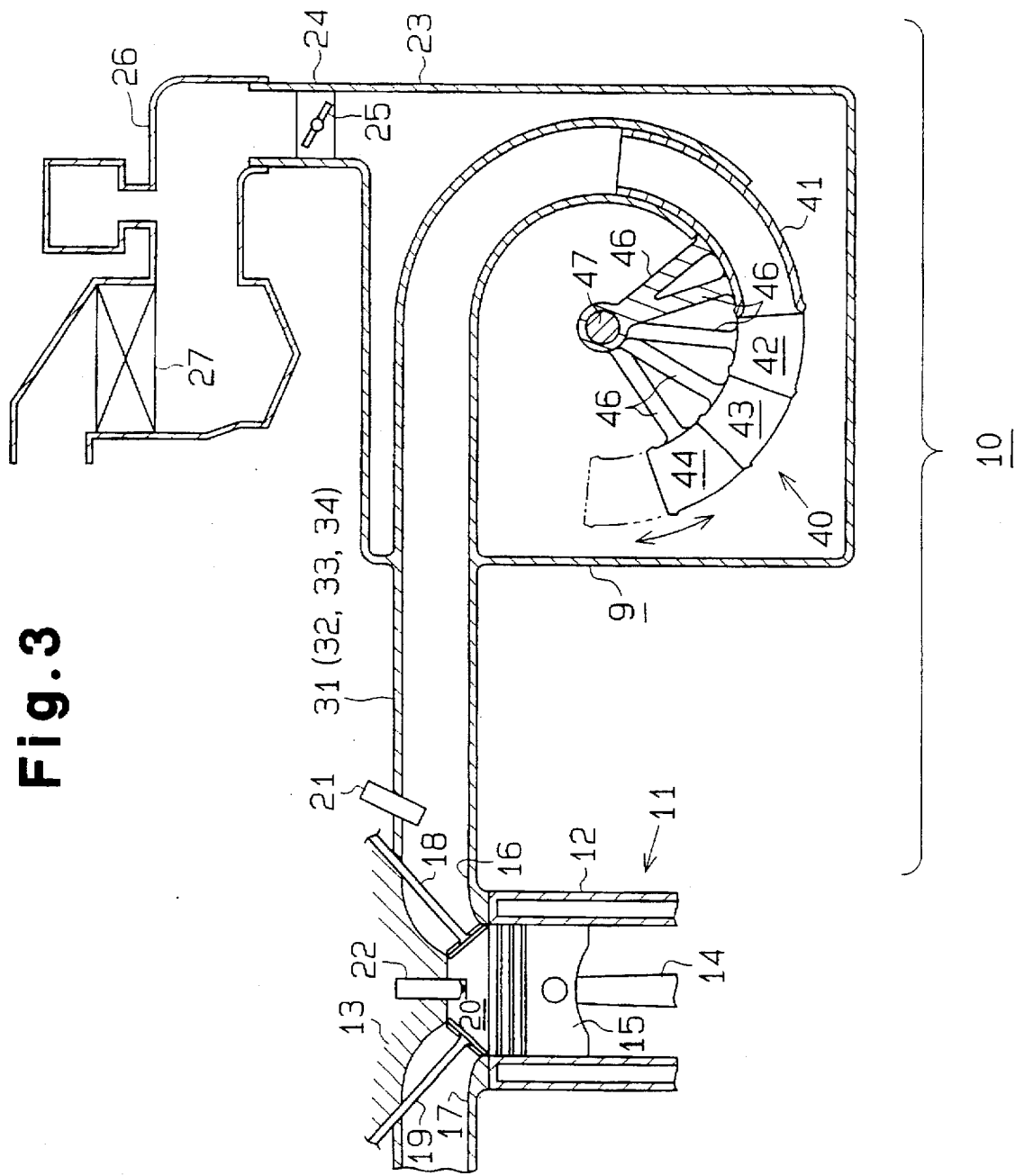
FIG. 3 is a cross-sectional view for explaining the operation of the variable intake apparatus of FIG. 1.

FIGS. 1 to 3 show a variable intake apparatus 10 of an engine according to a first embodiment of the present invention. The engine 11 includes a cylinder block 12 and a cylinder head 13. A plurality of cylinders (four cylinders #1, #2, #3, #4 in this embodiment) are defined in the cylinder block 12. The cylinder head 13 is located on the top of the cylinder block 12.

A piston 15 is accommodated in each of the cylinders #1 to #4. Each piston 15 is coupled to a crank shaft (not shown) by a connecting rod 14. Each piston 15 reciprocates in the associated cylinder #1 to #4 at a predetermined timing. The inner wall of each cylinder, the associated cylinder head 13 and the associated piston 15 define a combustion chamber 20.

The cylinder head 13 has a plurality of intake ports 16 and exhaust ports 17. Each intake port 16 and exhaust port 17 correspond to each of the cylinders #1 to #4. Each intake port 16 is provided with an intake valve 18 and an injector 21. Each exhaust port 17 is provided with an exhaust valve 19. Each injector 21 injects fuel to the associated intake port 16. Each of the cylinders #1 to #4 is provided with a spark plug 22. A part of each spark plug 22 is located in the associated combustion chamber 20. An electronic control unit (ECU) 100 controls the injectors 21 and the spark plugs 22.

The variable intake apparatus 10 has an intake manifold 9. The manifold 9 includes a surge tank 23 and a plurality (four in this embodiment) of branch pipes 31, 32, 33, 34. As shown in FIG. 2, the surge tank 23 is offset from the longitudinal center of the engine 12. The branch pipes 31 to 34 are communicated with the surge tank 23. Since the surge tank 23 is offset from the engine's longitudinal center, each of the branch pipes 31 to 34 has different shape and passage length from the others. As shown in FIG. 1, the branch pipes 31 to 34 bend along a predetermined imaginary circle in the surge tank 23.

Hereinafter "passage length" refers to the length of a pipe along the axis thereof.

The surge tank 23 has a variable intake mechanism 40 for continuously changing the effective passage length of the intake passages. The variable intake mechanism 40 includes a plurality (four in this embodiment) of movable pipes 41, 42, 43, 44 and a motor 45 for actuating the movable pipes 41 to 44. Each of the movable pipes 41 to 44 telescopes within the associated one of the branch pipes 31 to 34. This extends or shortens intake passages, thereby continuously changing the effective passage length of the intake passages. Thus, each intake passage has a fixed portion and a variable portion 41 to 44. The ECU 100 controls the variable intake mechanism 40 by actuating the motor 45 based on the engine speed, which is sensed by the sensor 110.

The radius of curvature of the movable pipes 41 to 44 is substantially the same as that of the branch pipes 31 to 34. Each of the movable pipes 41 to 44 has a pair of arms 46 extending therefrom. The distal end of the arms 46 is located at the center of the circle formed by the pipes 31 to 34 and 41 to 44. The distal ends of the arms 46 are coupled to a shaft 47 located at the center of the circle. The shaft 47 is directly or indirectly rotated by the motor 45.

The passage lengths of the movable pipes 41 to 44 are different from one another such that the effective passage lengths of the intake passages are equal. More specifically, the passage lengths $L1, L2, L3, L4$ of the branch pipes 31 to 34 and the passage lengths $L11, L12, L13, L14$ of the movable pipes 41 to 44 satisfy the following equation (1).

$$(L1+L11)=(L2+L12)=(L3+L13)=(L4+L14) \qquad (1)$$

The passage lengths of the movable pipes 41 to 44 are determined such that the passage lengths from the intake ports 16 to the entrance ends of the movable pipes are the same.

A throttle body 24 provided at the inlet of the surge tank 23 has a throttle valve 25. An air cleaner 27 is connected to the throttle body 24 by an air cleaner hose 26. The throttle valve 25 controls the amount of airflow through the throttle body 24.

The operation of the above variable intake apparatus 10 will now be described. Right before the engine 11 is started, the movable pipes 41 to 44 are positioned such that the effective passage lengths of the intake passage are maximized. In other words, the movable pipes 41 to 44 are extended from the branch pipes 31 to 34 to the greatest degree.

When the engine 11 is started, air drawn into the air cleaner 27 flows to each intake port 16 via the hose 26, the throttle body 24, the surge tank 23, the movable pipes 41 to 44 and the branch pipes 31 to 34. The air is then drawn into each combustion chamber 20. The airflow through the intake manifold 9 to each intake port 16 includes compression waves (pulsation flow) consisting of low density parts and high density parts. The ECU 100 controls the injector 21 an a predetermined timing such that fuel is injected from each injector 21 into the associated intake port 16. The injected fuel, together with intake air, forms an air-fuel mixture that is drawn into each combustion chamber 20.

In a suction stroke of the engine 11, a high density part, or a high pressure part of the intake air, reaches each intake port 16 right before each intake valve 18 is closed. This causes the air to be most efficiently drawn into each combustion chamber 20. Each spark plug 22 is activated in the latter half of the consecutive compression stroke. This burns the air-fuel mixture in a combustion stroke, thereby generating torque in the engine 11.

Right after the engine 11 is started, the engine speed is low and the interval between openings and closings of each intake valve 18 is relatively long. Accordingly, the pulsation cycle of the airflow through each of the branch pipes 31 to 34 is relatively long. Therefore, the natural wavelength of the pulsation of the airflow through each of the branch pipes 31 to 34 is relatively long.

The effective passage length of the intake passages is elongated by extending the movable pipes 41 to 44 to match the wavelength of the pulsating airflow in the branch pipes 31 to 34. This takes advantage of the inertia effect of the intake air drawn into each combustion chamber 20 without disturbing the cycle of the pulsating flow of the intake air. The volumetric efficiency of the intake air is thus increased.

The above variable intake apparatus 10 has the branch pipe 31 to 34 of different lengths. The passage lengths of the movable pipes 41 to 44 are determined such that the effective passage lengths of the intake passages become equal. Therefore, the volumetric efficiency in the combustion chambers 20 is equalized and improved. This equalizes and improves the combustion efficiency of the air-fuel mixture in the combustion chambers 20.

As the engine speed increases, the ECU 100 controls the motor 45 to retract the movable pipes 41 to 44 for shortening the effective passage lengths of the intake passages as illustrated by solid lines in FIG. 3. The airflow through the variable intake apparatus 10 includes compression waves (pulsating flow). The air reaches each of the intake ports 16 and is efficiently drawn into each of the combustion chambers 20 with fuel injected from the injectors 21.

When the engine speed is high, the cycle of opening and closing of each intake valve 18 is relatively short. Therefore, the pulsation cycle of the air flowing through each of the branch pipes 31 to 34 is short. This shortens the natural wavelength of the air flowing through each of the branch pipes 31 to 34.

Accordingly, the movable pipes 41 to 44 are retracted to shorten the effective passage lengths of the intake passages to match the wavelength of the pulsating flow of the airflow through each of the branch pipes 31 to 34. The advantageous inertia effect of the intake air is obtained without disturbing the pulsating cycle of the intake air. This improves the volumetric efficiency of the intake air. Accordingly, the combustion efficiency of the air-fuel mixture in the combustion chambers 20 is equalized and improved.

When the engine speed drops after having increased, the movable pipes 41 to 44 are moved to a position illustrated by solid lines in FIG. 1. This again elongates the effective passage lengths of the intake passages. The movable pipes 41 to 44 are moved in accordance with the fluctuation in the volumetric efficiency of intake air in each combustion chamber 20 in relation with the engine speed. Accordingly, the volumetric efficiency in each combustion chamber 20 is constantly maintained at an optimal state.

Figure 4:
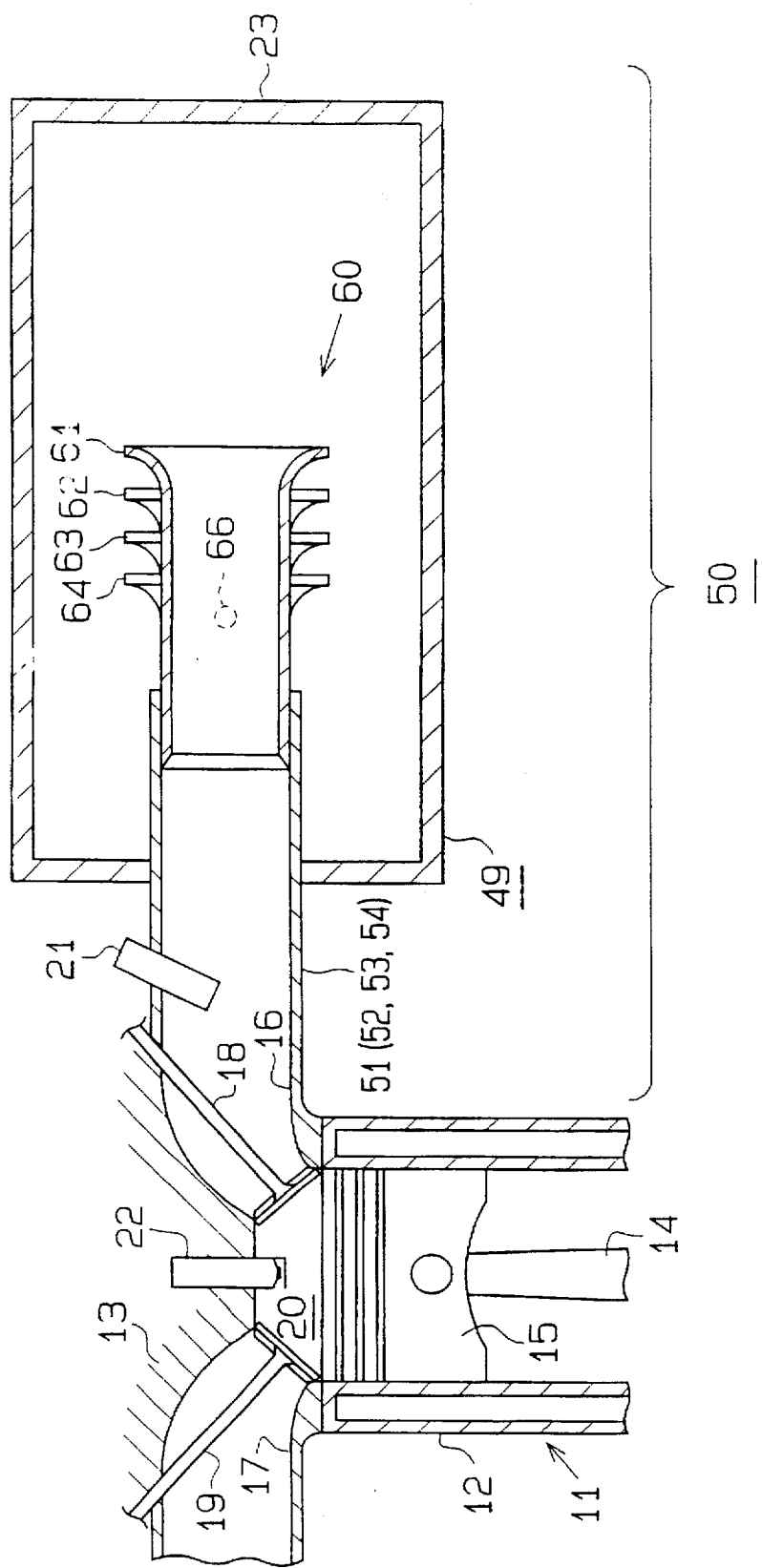
FIG. 4 is a cross-sectional view diagrammatically illustrating the structure of a variable intake apparatus according to a second embodiment of the present invention.

A variable intake apparatus 50 according to a second embodiment of the present invention will now be described with reference to FIGS. 4 to 6. The same numerals are given to the same structure and parts used in the apparatus 10 of the first embodiment and description thereof will be omitted. The differences from the first embodiment will be mainly discussed below.

The variable intake apparatus 50 includes an intake manifold 49. The manifold 49 includes a surge tank 23, a plurality (four in this embodiment) of branch pipes 51, 52, 53, 54. As shown in FIGS. 5 and 6, the surge tank 23 is positioned offset from the longitudinal center of the engine 12. The branch pipes 51 to 54 are communicated with the surge tank 23 and extend therefrom. Since the surge tank 23 is offset from the longitudinal center of the engine 12, each of the branch pipes 51 to 54 have a different passage length and shape from one another. The branch pipes 51 to 54 are extended parallel in the horizontal direction in FIG. 1 within the surge tank 23.

The surge tank 23 has a variable intake mechanism 60 for continuously changing the effective length of the intake passages. The variable intake mechanism 60 includes a plurality (four in this embodiment) of movable pipes 61, 62, 63, 64 and a motor 65 for moving the movable pipes 61 to 64. Each of the movable pipes 61 to 64 slides within the associated one of the branch pipes 51 to 54. This continuously changes the effective passage lengths of the intake passages. Based on the engine speed, the ECU 100 actuates the motor 65 to control the variable intake mechanism 50.

The diameters of the movable pipes 51 to 54 are determined such that the pipes 51 to 54 are slidable within the branch pipes 51 to 54. The distal ends of the movable pipes are tapered for facilitating suction of air. The movable pipes 61 to 64 linearly reciprocate along the axes of the branch pipes 51 to 54.

The movable pipes 61 to 64 are coupled to one another by a plurality of rods 66. A rod 66 that is located at the outside of the pipe 61 is slidably engaged with a guiding slit 231 formed in a wall of the surge tank 23. Likewise, a rod 66 that is located at the outside of the pipe 66 is slidably engaged with a recess 232 formed in a wall of the surge tank 23. The guiding slit 231 and the recess 232 are formed parallel to the branch pipes 51 to 54. A carriage 67 is located on the outer wall of the surge tank 23. The rod 66 is coupled to the carriage 67. The movement of carriage 67 along the slit 232 allows the pipes 61 to 64 to reciprocate in the branch pipes 51 to 54.

The length of the carriage 67 is longer than the stroke of the rods 66, or the length of the recess 231 and the slit 232, for smooth reciprocation of the pipes 61 to 64. The carriage 67 has a rack 671 extending along the slit 232. A pinion 652 is attached to the distal end of a rotary shaft 651 of the motor 65. The pinion 652 is engaged with the rack 671.

The rotation of the rotary shaft 651 by the motor 65 is converted to sliding motion of the carriage 67 along the slit 232 by cooperation of the rack 671 and the pinion 652. Accordingly, the movable pipes 61 to 64 integrally slide within the branch pipes 51 to 54.

The passage lengths of the movable pipes 61 to 64 are different such that the effective passage lengths of the intake passages are equal. That is, the passage lengths L1, L2, L3, L4 of the branch pipes 51 to 54 and the passage lengths L11, L12, L13, L14 of the movable pipes satisfy the equation (1) of the first embodiment.

The lengths of the movable pipes 61 to 64 are determined such that the lengths from the inlet of the intake ports 16 to the entrance ends of the movable pipes 61 to 64 are equal.

The operation of the above described variable intake apparatus 50 will now be described. Right before the engine 11 is started, the movable pipes 61 to 64 are positioned such that the effective passage lengths of the intake passages are maximized. In other words, the movable pipes 61 to 64 are extended from the branch pipes 51 to 54 to the greatest degree.

As in the first embodiment, air is drawn into the pipe 26 from the air cleaner 27 and then forms air-fuel mixture with fuel injected from the injector 21. The mixture is drawn into each combustion chamber 20.

The position of the movable pipes 61 to 64 is adjusted such that the effective passage lengths of the intake passages conform with the natural wavelength of the airflow through the branch pipes 51 to 54. This takes advantage of the inertia effect of the intake air drawn into each combustion chamber 20 without disturbing the cycle of the pulsating airflow through the branch pipes 51 to 54.

The lengths of the movable pipes 61 to 64 are determined such that the effective passage lengths of the intake passages are equal. This equalizes and improves the volumetric efficiency of the intake air and the combustion efficiency of the air-fuel mixture in each combustion chamber 20.

As the engine speed increases, the ECU 100 controls the motor 45 to retract the movable pipes 61 to 64. This shortens the effective passage lengths of the intake passages as illustrated by solid lines in FIG. 6. The airflow through the variable intake apparatus 50 forms an air-fuel mixture with fuel injected from the injector 21. The mixture is drawn into each combustion chamber 20.

The movable pipes 61 to 64 are retracted into the branch pipes 51 to 54 such that the effective passage lengths of the intake passages conform with the natural wavelength of the airflow through the branch pipes 51 to 54. This takes advantage of the inertia effect of intake air drawn into each combustion chamber 20 without disturbing the cycle of the pulsating airflow through branch pipes 51 to 54. This equalizes and improves the volumetric efficiency of the intake air and the combustion efficiency of the air-fuel mixture in each combustion chamber 20.

Figure 5:
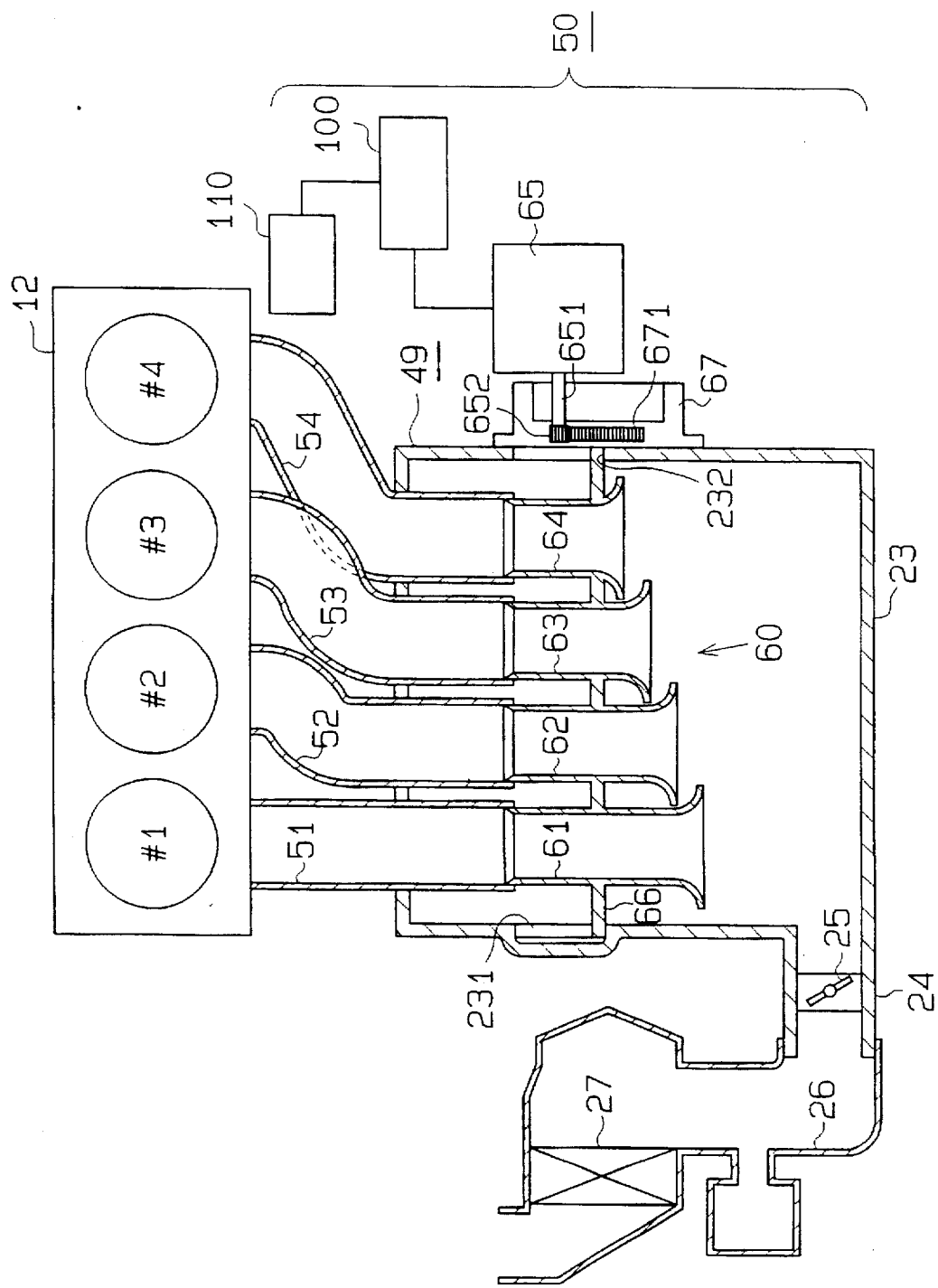
FIG. 5 is a partial cross-sectional view illustrating the variable intake apparatus of FIG. 4.
Figure 6:
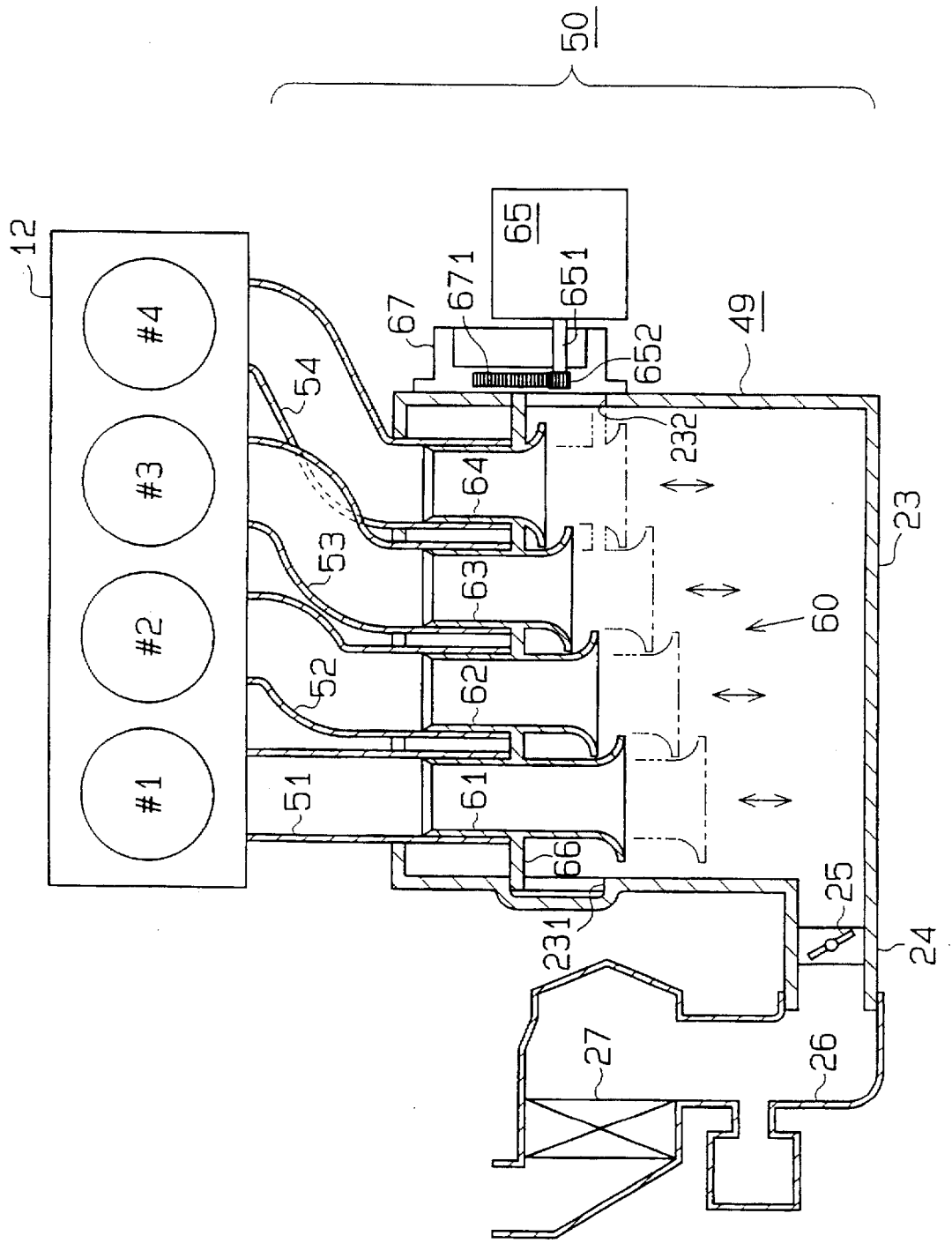
FIG. 6 is a cross-sectional view for explaining the operation of the variable intake apparatus of FIG. 4.
Figure 7:
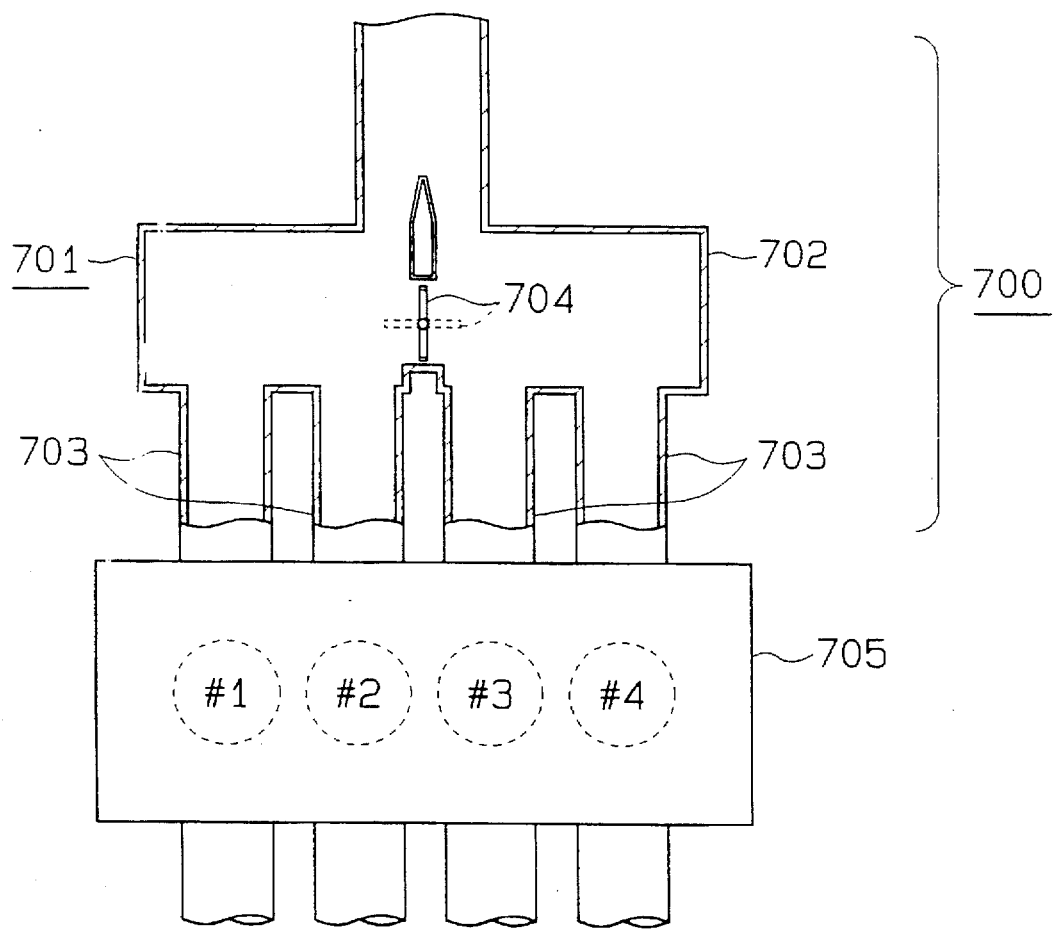
FIG. 7 is a cross-sectional view illustrating a prior art variable intake apparatus.
Figure 8:
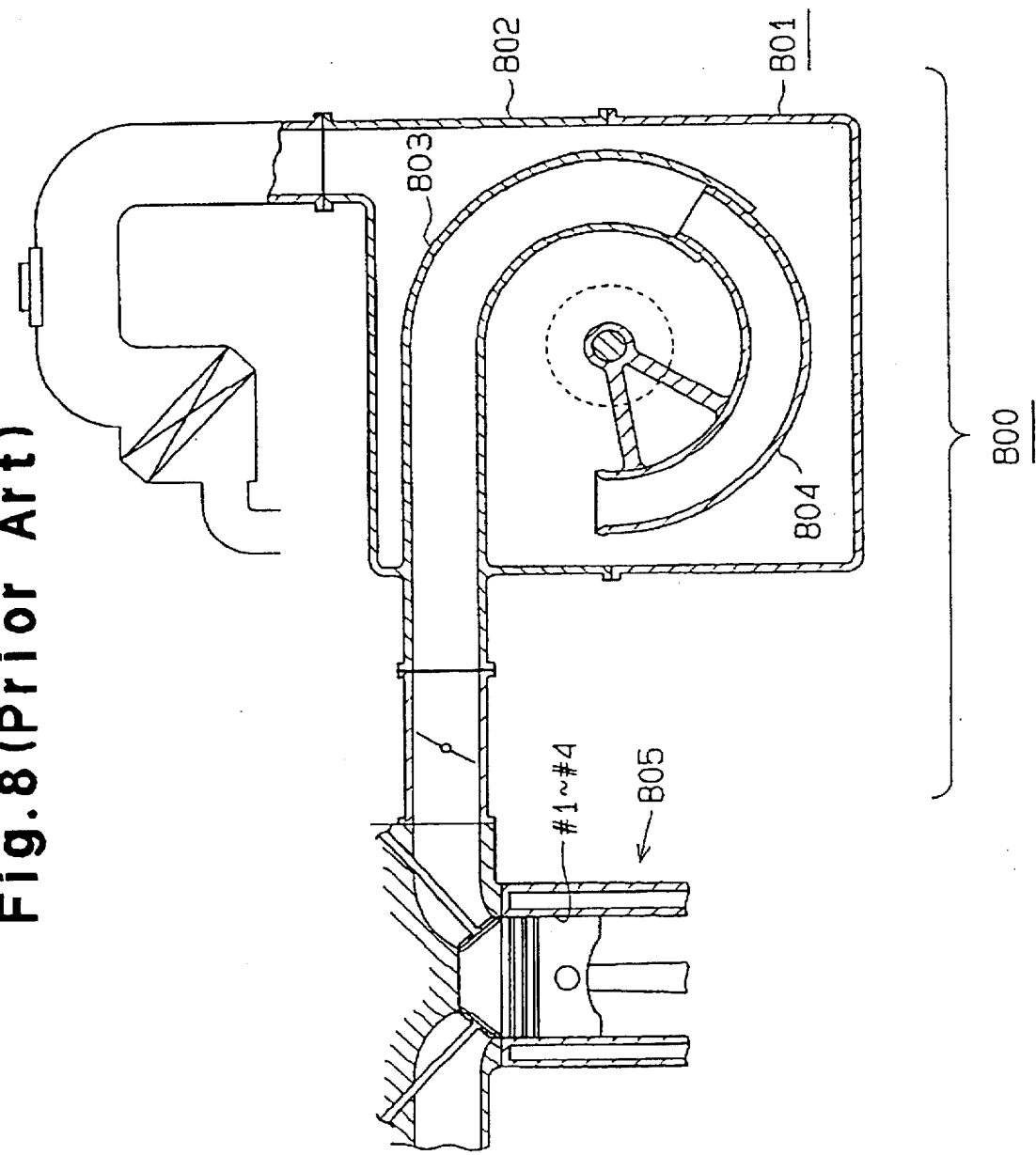
FIG. 8 is a cross-sectional view illustrating another prior art variable intake apparatus.

When the engine speed drops after having increased, the movable pipes 61 to 64 are moved to a position illustrated by solid lines in FIG. 5. This again elongates the effective passage lengths of the intake passages. The movable pipes 61 to 64 are moved in accordance with the fluctuation in the volumetric efficiency of intake air in each combustion chamber 20 in relation with the engine speed. Accordingly, the volumetric efficiency in each combustion chamber 20 is constantly maintained at an optimal state.

As described above, in the variable intake apparatus 10, 50 according to the first and second embodiments, the effective passage lengths of the intake passages and 51 to 54 are adjusted in accordance with the engine speed. Therefore, the effective lengths of the intake passages are adjusted without disturbing the pulsation cycle of air drawn into the combustion chambers 20. Accordingly, the volumetric efficiency of the air drawn into the combustion chambers 20 is optimized in accordance with the fluctuation of the engine speed. This improves the combustion efficiency of the air-fuel mixture in each combustion chamber 20, thereby increasing the engine's torque. Further, since the air pulsation cycle is not disturbed, the noise generated when air is drawn into each combustion chamber 20 is reduced.

In the variable intake mechanism 40 and 60, the lengths of the intake passages are substantially equalized. This equalizes the volumetric efficiency of intake air in each combustion chamber 20, thereby equalizing the combustion efficiency in each combustion chamber 20. The combustion efficiency of the combustion chambers 20 are equally improved by actuating the variable intake mechanism 40 and 60 in accordance with the engine speed. This positively increases the torque of the engine 11, thereby improving the performance of the vehicle.

In the variable intake apparatus 10, the pipes 31 to 34 and 41 to 44 are curved in the surge tank 23. Therefore, unlike the variable intake apparatus 50, in which the pipes 51 to 54 and 61 to 64 are horizontally extended, the apparatus 10 can employ a more narrow the surge tank 23. This facilitates the mounting of the apparatus 10 in the engine compartment of a vehicle.

The variable intake apparatus 60 has the pipes 51 to 54 and 61 to 64 that are horizontally extended in the surge tank 23. This structure reduces the resistance of the air flowing into the branch pipes 51 to 54 via the movable pipe 61 to 64. Therefore, air is more smoothly drawn into each intake port 16. This further improves the volumetric efficiency of intake air in the combustion chambers 20, thereby increasing the power of the engine 11.

Although only two embodiments of the present invention have been described herein, it should be apparent to those skilled in the art that the present invention may be embodied in many other specific forms without departing from the spirit or scope of the invention. Particularly, the invention may be embodied in the following forms:

In the first and second embodiments, the movable pipes 41 to 44 and 61 to 64 are activated by the motors 45, 65. However, each of the pipes 41 to 44 and 61 to 64 may be activated by an independent motor (actuator). In this case, the required torque for a motor is relatively small. Each motor may be small, accordingly.

In the first and second embodiments, the ECU 100 determines the moving amount of the movable pipes 41 to 44 and 61 to 64 based on the engine speed. The ECU 100 may learn the moving amount of the movable pipes 41 to 44 and 61 to 64 in relation with various parameters of the engine's running condition. The ECU 100 may thus adjust the moving amount of the movable pipes 41 to 44 and 61 to 64 based on the learned data. This allows the effective passage length of the intake passages to be more accurately controlled in accordance with the fluctuation of the engine speed.

The variable intake apparatuses 40, 60 have a tolerance for individual engines 11. The passage lengths of the branch pipes 31 to 34 and 51 to 54 may differ from one engine 11 to another. The ECU 100 may learn the difference in the passage lengths and reflect the resultant data of the difference on the control of the movable pipes 41 to 44 and 61 to 64. This allows the optimum volumetric efficiency of the intake air in each combustion chamber to be obtained in the individual engines 11. The power of the individual engines 11 is thus further increased.

In the first and second embodiments, the effective passage lengths of the intake passages are continuously changed by continuously moving the movable pipes 41 to 44 and 61 to 64. However, the movable pipes 41 to 44 and 61 to 64 may be moved incrementally for changing the effective passage lengths of the intake passages incrementally.

In the first and second embodiments, the movable pipes 41 to 44 and 61 to 64 are actuated by the motors 45, 65. However, if the movable pipes are actuated incrementally, the movable pipes may be actuated by a vacuum actuator, which operates based on the difference between a negative pressure and the atmospheric pressure.

Therefore, the present examples and embodiments are to be considered as illustrative and not restrictive and the invention is not to be limited to the details giving herein, but may be modified within the scope of the appended claims.

What is claimed is:

1. A variable intake apparatus in combination with an internal combustion engine, the combination comprising:

at least a first and a second combustion chamber located in the engine;

sensor means for sensing the state of a running condition of the engine;

at least a first and a second intake passage for conducting air to the combustion chambers, respectively, wherein the volumetric efficiency of each of the combustion chambers for a given state of the running condition is related to the length of the associated intake passage, each intake passage including a fixed portion and a variable portion;

length changing means associated with each variable portion for changing the effective lengths of the intake passages in accordance with a change in the state of the running condition in order to improve the volumetric efficiency of the engine, wherein the length changing means adds a predetermined distance to or subtracts a predetermined distance from the effective length of each intake passage in accordance with the state of the running condition of the engine by changing the variable portion of the intake passage, and wherein the predetermined distance added to or subtracted from the effective length of the first intake passage is equal to the predetermined distance added to or subtracted from the effective length of the second intake passage so that the effective length of the first intake passage always substantially matches the effective length of the second intake passage, and wherein the lengths of the fixed portions of the two intake passages are significantly different from one another.

2. The combination according to claim 1, wherein the running condition sensed by the sensor means is the engine speed.

3. The combination according to claim 2, wherein the length changing means continuously varies the effective lengths of the intake passages to substantially optimize the volumetric efficiency at all speeds within a predetermined range of engine operating speeds.

4. The combination according to claim 2, wherein the length changing means incrementally varies the effective lengths of the intake passages to substantially optimize the volumetric efficiency at all speeds within a predetermined range of engine operating speeds.

5. The combination according to claim 1, wherein the variable portions of the first and second intake passages include first and second telescoping pipes, respectively, that extend from and telescope with respect to the fixed portions of the intake passages to change the effective lengths of the intake passages.

6. The combination according to claim 5, wherein the distance that the first telescoping pipe extends from the fixed portion of the first intake passage is different from the distance that the second telescoping pipe extends from the fixed portion of the second intake passage.

7. The combination according to claim 6, wherein an actuator moves the variable portions, and the telescoping pipes are connected to one another to move in unison.

8. A variable intake apparatus in combination with an internal combustion engine, the combination comprising:

at least a first and a second combustion chamber located in the engine;

sensor means for sensing a running condition of the engine;

at least a first and a second intake passage for conducting air to the combustion chambers, respectively, wherein the volumetric efficiency of each of the combustion chambers for a given state of the running condition of the engine is related to the length of the associated intake passage, each intake passage including a fixed portion and a variable portion extending from the fixed portion;

length changing means associated with each variable portion for changing the effective lengths of the intake passages in accordance with a change in the state of the running condition of the engine in order to improve the volumetric efficiency of the engine, wherein the length changing means adds a predetermined distance to or subtracts a predetermined distance from the effective length of each intake passage in accordance with the state of the running condition of the engine by changing the distance by which the variable portion extends from the fixed portion of the intake passage, and wherein the predetermined distance added to or subtracted from the effective length of the first intake passage is equal to the predetermined distance added to or subtracted from the effective length of the second intake passage so that the effective length of the first intake passage always substantially matches the effective length of the second intake passage;

an actuator for adjusting the position of the variable portion of the intake passages;

a controller for controlling the actuator based on the state of the running condition of the engine sensed by the sensor;

wherein the length of the fixed portion of the first intake passage is longer than the length of the fixed portion of the second intake passage by a first given distance, and wherein the variable portion of the second passage extends from the fixed portion of the second intake passage by a second given distance, and wherein the first given distance is substantially equal to the second given distance.

9. The combination according to claim 8, wherein the running condition sensed by the sensor means is the engine speed.

10. The combination according to claim 9, wherein the length changing means continuously varies the effective lengths of the intake passages to substantially optimize the volumetric efficiency at all speeds within a predetermined range of engine operating speeds.

11. The combination according to claim 9, wherein the length changing means incrementally varies the effective lengths of the intake passages to substantially optimize the volumetric efficiency at all speeds within a predetermined range of engine operating speeds.

12. The combination according to claim 8, wherein the variable portions of the first and second intake passages include first and second telescoping pipes, respectively, that telescope with respect to the fixed portions of the intake passages to change the effective lengths of the intake passages.

13. The combination according to claim 12, wherein the telescoping pipes are connected to one another to move in unison when moved by the actuator.

14. A variable intake apparatus in combination with an internal combustion engine, the combination comprising:

at least a first and a second combustion chamber located in the engine;

speed sensor means for sensing the speed of the engine;

at least a first and a second intake passage for conducting air to the combustion chambers, respectively, wherein the volumetric efficiency of each of the combustion chambers for a given speed of the engine is related to the length of the associated intake passage, each intake passage including a fixed portion and a variable portion extending from the fixed portion;

a surge chamber containing intake air surrounding the entrances of the intake passages, wherein the variable portions of the intake passages are located in the surge chamber;

length changing means associated with each variable portion for changing the effective lengths of the intake passages in accordance with a change in the speed of the engine in order to improve the volumetric efficiency of the engine, wherein the length changing means adds a predetermined distance to or subtracts a predetermined distance from the effective length of each intake passage in accordance with the state of the speed of the engine by changing the distance by which the variable portion extends from the fixed portion of the intake passage, and wherein the predetermined distance added to or subtracted from the effective length of the first intake passage is equal to the predetermined distance added to or subtracted from the effective length of the second intake passage so that the effective length of the first intake passage always substantially matches the effective length of the second intake passage;

wherein the variable portions of the first and second intake passages include first and second telescoping pipes, respectively, that telescope with respect to the fixed portions of the intake passages to change the effective lengths of the intake passages;

an actuator for adjusting the position of the variable portion of the intake passages;

a controller for controlling the actuator based on the speed of the engine sensed by the sensor;

wherein the length of the fixed portion of the first intake passage is longer than the length of the fixed portion of the second intake passage by a first given distance, and wherein the variable portion of the second passage extends from the fixed portion of the second intake passage by a second given distance, and wherein the first given distance is substantially equal to the second given distance.

* * * * *